Figure 11:
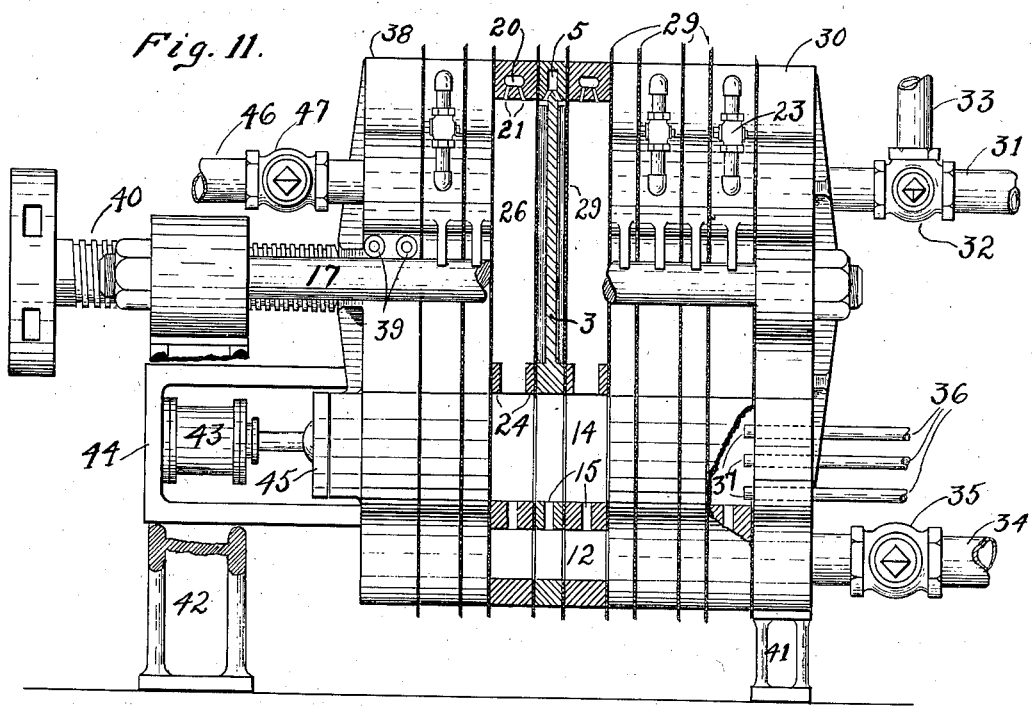

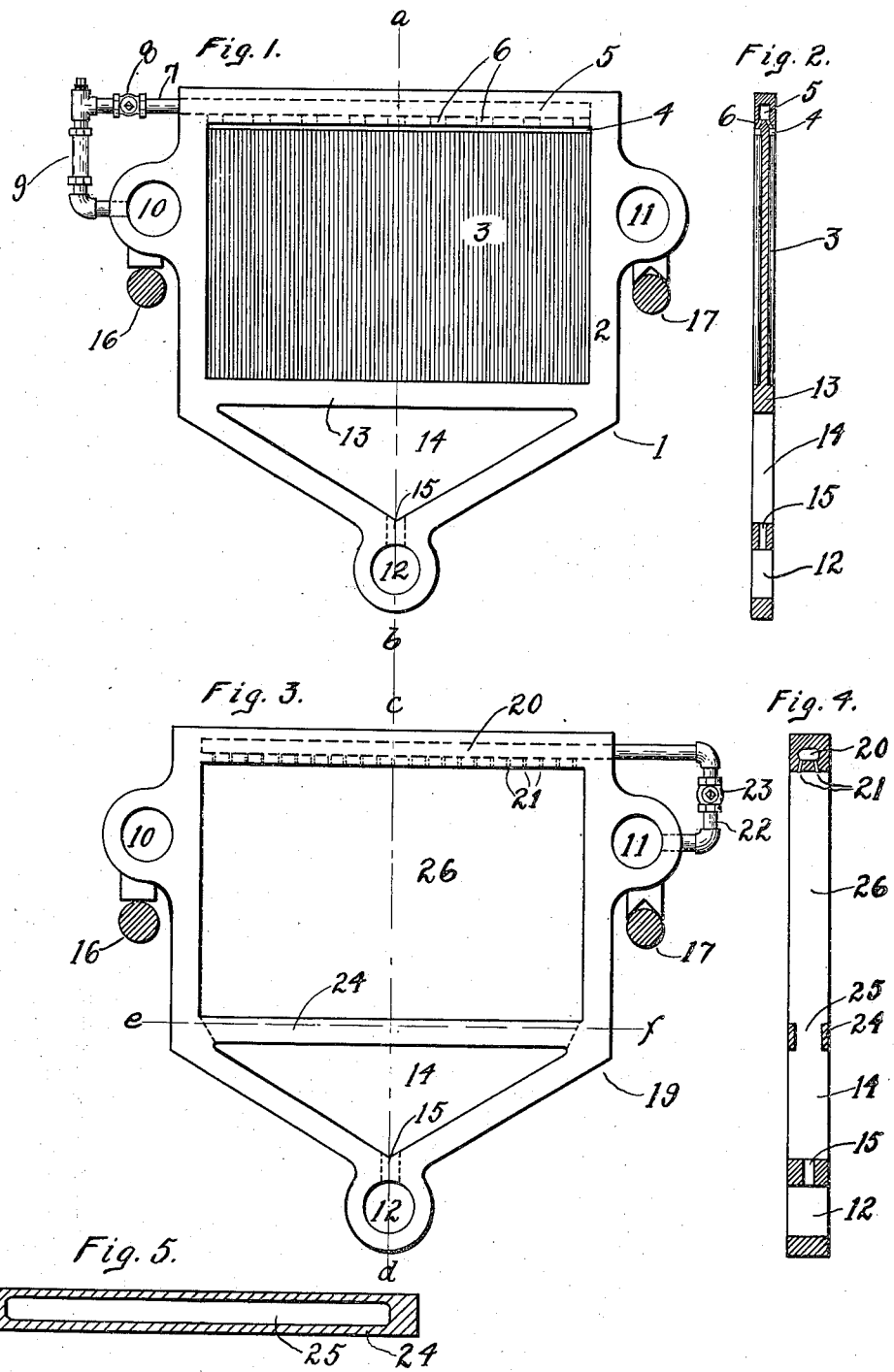

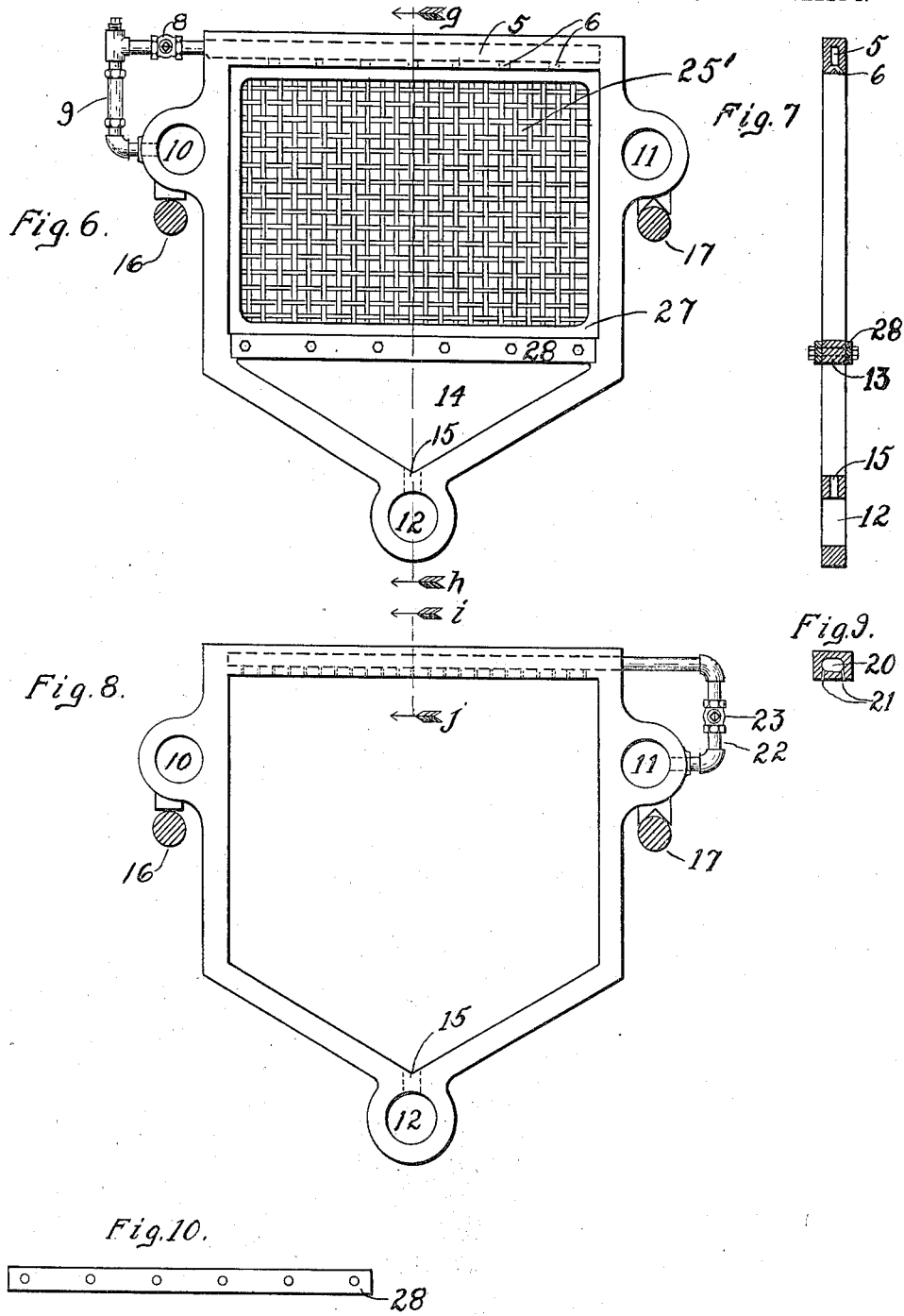

E. J. SWEETLAND.
PRESSURE FILTER.
APPLICATION FILED AUG. 30, 1910.

996,537.

Patented June 27, 1911.

3 SHEETS—SHEET 3.

WITNESSES:

INVENTOR:

UNITED STATES PATENT OFFICE.

ERNEST J. SWEETLAND, OF LOS ANGELES, CALIFORNIA.

PRESSURE-FILTER.

996,537.

Specification of Letters Patent. Patented June 27, 1911.

Application filed August 30, 1910. Serial No. 579,627.

*To all whom it may concern:*

Be it known that I, ERNEST J. SWEETLAND, a citizen of the United States, and resident of Los Angeles, county of Los Angeles, State of California, have invented new and useful Improvements in Pressure-Filters, of which the following is a specification.

A special object of this invention is to provide a pressure filter wherein the solid matter which accumulates upon the filtering medium, which is usually canvas or some similar fabric, may be removed without hand labor and without separating the units of the filter.

Another object of the present invention is to provide a pressure filter wherein a space is provided within the filter for the accumulation and storage of solid matter without hindrance to further filtration.

A further object is to provide a pressure filter wherein the filtrate from each unit is caused to pass by, or through, a transparent substance, which enables the operator to conveniently detect any leaks that might occur in the filtering medium.

A still further object is to provide a filter which accomplishes the above objects without the necessity of any special preparation of the filter cloth other than cutting it to correspond to the shape of the filter units.

It is the intention of the inventor that the present application shall not conflict with Patents Nos. 885,398, 887,285 and 929,636, all of which were issued to the present applicant.

Referring to the accompanying drawings, Figure 1 is an end elevation of one of the filter units removed. Since the units which make up the body of the filter are of two kinds, the one shown in Fig. 1 shall be called the drainage unit throughout this application to distinguish it from the one shown in Fig. 3. Fig. 2 is a sectional elevation of Fig. 1 taken on the line *a b*. Fig. 3 is an end elevation of one of the units which are placed between the drainage units throughout the filter. This member shall be designated as the distance frame throughout this specification, since it constitutes a spacer, or distance piece between the drainage units of the filter. Fig. 4 is a sectional elevation of Fig. 3 on line *c d*. Fig. 5 is a horizontal section on the line *e f* of Fig. 3 showing the open construction of the division bar. Fig. 6 is an end elevation of a modified form of drainage unit wherein the corrugated surface of Fig. 1 is displaced by a woven web, which offers the same drainage facilities as the corrugated surface, and is lighter. Fig. 7 is a vertical section on the line *g h* of Fig. 6, the web 25′ and frame 27 being removed. Fig. 8 is an end elevation of a modified distance frame adapted for use with the drainage unit shown in Fig. 6. This differs from the distance frame shown in Fig. 3 in that the division bar is omitted. Fig. 9 is a section on the line *i j* of Fig. 8. Fig. 10 is an elevation of the flat iron bar which is bolted to the modified drainage unit shown in Fig. 6. It is shown in section bolted in place in Fig. 7. This bar is mechanically equivalent to the division bar 24 of Fig. 3 of the regular construction, both being used to hold the filter cloth tightly against the bar 13 of the drainage unit. Fig. 11 is a side elevation of a pressure filter assembled, and is my preferred construction, being built with units like those shown in Figs. 1 and 3. To better illustrate the interior construction, two of the distance frames and one of the drainage units are shown in section on the vertical center line of the filter. A portion near one end of the filter is shown as being broken away in order to show the discharge nozzles 37.

Referring particularly to the parts, with special reference to Fig. 1, the drainage unit 1 is usually made of cast iron with the marginal surfaces 2 planed to make them smooth and level. The rectangular portion 3 is corrugated, the corrugations terminating in the transverse groove 4. Across the top of the unit is the channel 5 which communicates with the groove 4 by a series of openings 6. The channel 5 terminates in a pipe connection 7, provided with a valve 8. By means of proper pipe fittings a glass tube 9 is made part of the pipe connection by means of which the liquid is caused to flow into the opening or conduit 10 of the drainage unit. Another passageway 11 is provided on the opposite side of the drainage unit. A third passageway 12 is located on the bottom of the unit. Across the bottom of the rectangular part of the drainage unit, just below the corrugated portion 3, extends a horizontal bar 13, below which is left a triangular open space 14. An opening 15 forms communication between this triangular space and the passageway 12. The weight of the entire unit rests upon the horizontal bars 16 and 17.

The outline of the distance frame 19 corresponds exactly with the outline of the drainage unit. It is provided with corresponding passageways 10, 11, 12 and 14, which are marked with corresponding reference numbers to those used in Fig. 1, since in the assembled filter the passageways in both members unite to form continuous conduits throughout the filter. This member is also provided with a passageway between 12 and 14 which is designated with the same number, 15 as the corresponding passageway in Fig. 1, since they both serve the same purpose in the assembled filter.

A channel 20 is formed across the top of the distance frame. A number of perforations 21 are formed in the frame through which a number of jets of any fluid may be projected from the channel 20 into the rectangular opening of the frame. The channel 20 is fed by the conduit 11, which communicates with it through the pipe 22, which is provided with a valve 23.

An important feature of my invention is the division bar 24, which is shown in horizontal section in Fig. 5. This bar is preferably cast integral to the distance frame, and has a large opening 25 which forms communication between the main opening of the frame, 26, and the triangular space 14.

The parts of the modified form of drainage unit and distance frame which correspond exactly to those of the regular form in Figs. 1 and 3 are marked with the same reference numbers as the corresponding parts in Figs. 1 and 3. In Fig. 6 the screen 25' mounted in the removable frame 27 is used in place of the corrugated grid 3 of the regular form. The function of the grid 3 and the screen 25' is to hold the filter cloth apart when under pressure, and allow the filtrate to flow into the channel 5. Any substance offering a rough or irregular surface may be substituted in this place without departing from the spirit of my invention.

The most important difference between the regular and the modified construction is in the omission of the division bar 24 from the modified distance frame. Since a hole is cut in each filter cloth corresponding to the opening 14 it is necessary to supply some means of holding the cloth firmly against the bar 13 of the drainage unit, as otherwise the liquid in the body of the filter could pass under the cloth and find its way into the channel 5 instead of passing through the cloth. In the modified form the flat removable bar 28 takes the place of bar 24 in the regular construction. In one case the bar is made part of the distance frame, while in the other it is a detachable part of the drainage member. The operation of the modification is exactly the same as the operation of the regular form.

Fig. 11 shows the assembled pressure filter of my preferred construction. Distance frames and drainage units are placed alternately throughout the filter, and a sheet of filter cloth is placed between each. Before the cloth is placed in the filter it is cut to the outline of the units, and holes are cut in it to correspond to the openings 10, 11, 12 and 14. The cloth fits between the plane surfaces of the units and forms a gasket between the units when they are pressed together. The cloth 29 is shown in Fig. 11. At one end of the series of units is a stationary head 30, which forms a closure for one end of the pressure filter. When the filter is assembled the openings 10, 11, 12 and 14 form continuous conduits throughout the length of the filter. Pipe 31 connects with conduit 10, and is provided with the 3-way valve 32 which has a side connection 33. Pipe 31 serves as a drain for filtered liquid, and pipe 33 supplies either compressed air or water to the interior of the drainage units when desired. Pipe 34 with valve 35 connects with conduit 12. The liquid to be filtered enters the filter through the pipe 34, passing into the conduit 12, and thence into the body of the filter through the openings 15. A series of pipes 36 enter the space 14 through the stationary head 30. Each one of these pipes terminates in a nozzle 37, which I shall designate as the discharge nozzles. At the other end of the filter is the movable head 38 mounted on rollers 39. A pressure screw 40 serves to press the units of the filter tightly together. The weight of the filter rests on the supports 41 and 42, the latter of which is broken away to show the hydraulic cylinder 43 supported by the yoke 44, which operates a door 45, which is the shape of, and forms a closure for the passageway 14. Pipe 46 with valve 47 communicates with conduit 11, and supplies water for washing accumulated residues from the filter.

*Method of operating.*—The body of the filter is filled with the liquid to be filtered through the valve 35, the liquid entering the conduit 12 and passing upward through the openings 15. When the filter is full the pressure of the liquid forces it through the cloth 29. The filtered liquid then flows upwardly through the openings 6 into the channel 5, through pipe 7, valve 8 and glass tube 9 into conduit 10, from which it drains through valve 32 and pipe 31. As filtration progresses the solid matter in the liquid deposits on the surface of the cloth 29, gradually forming an even deposit of solid matter upon the surface of the cloth. In this type of filter it is not advisable to allow filtration to continue until the entire space of the distance frame is filled up with solid matter; but to discharge the filter before the layers of solid matter on two opposite filter cloths have become thick enough to touch together. In other words, there should be a space between the layers of solid matter when the filter is discharged. If the liquid being filtered is valuable, and it is desirable to wash the solid matter before discharging, this may be done by applying suction to pipe 31, which holds the cakes of solid matter on the cloths, while the excess liquid in the bottom of the filter is drained out, and then entering water or other fluid through pipe 34 and forcing it by pressure through the layers of deposited solids. By this process the valuable liquid retained by the solids is displaced by water or other fluid.

*Discharging the filter.*—The accumulated solids are discharged from the filter by opening the door 45 by means of hydraulic cylinder 43, and then turning the 3-way valve 32 so that air under pressure, or water, as the case may be, enters conduit 10 from pipe 33, which dislodges the layers of solid matter from the cloths by creating pressure in back of them. Water under high pressure is then turned through pipes 36 and is projected through nozzles 37 through the space 14, the effect of which is to flush the solid matter from the filter through the door 45 as it falls from the cloths. At the same time water under pressure is admitted through conduit 11 through valve 47, from which it enters channel 20 from which it passes through perforations 21 in a number of forcible jets, washing thoroughly the filter cloths. This done, door 45 is closed and the filter is ready for further use.

*Storage of solids in body of filter.*—It will be understood that the accumulation of solid matter on the filter cloths retards filtration on account of the resistance of the layers of finely divided solid matter to the passage of liquid through them. In some cases the resistance of the solid matter is so great as to make further filtration almost impossible after a thin layer has been deposited. In the old-style plate and frame filter presses the solids had to be removed by hand every time sufficient solids deposited to obstruct filtration. In my invention this objection is overcome by the space 14, for when the rate of filtration becomes slow by reason of accumulated solids on the cloths, the inlet valve may be closed for a moment and any fluid under pressure admitted through the pipe 33 and valve 32, the effect of which is to disengage the solids from the filter cloths and cause them to fall into the space 14. It should be understood that the deposited solids form into a cohesive layer under the pressure of filtration, and fall into the space 14 in plastic masses, which do not disintegrate and redeposit upon the cloths when filtration is resumed.

I do not limit myself to the specific construction described. The shape of the filter units may be varied to suit special conditions. The principle may be applied to square, rectangular, or round units as well as the shape herein described.

Having thus described my invention, what I claim is:

1. In a drainage member for pressure filters comprising an upper drainage portion, a division bar below said drainage portion and an open space below the division bar.

2. In a drainage member for pressure filters comprising an upper drainage portion, a division bar below said drainage portion and an open space below said division bar, means of holding the filter cloth against the division bar.

3. A pressure filter unit provided with registering openings to aline with similar openings in adjacent units, drainage channels in the upper portion of said unit and an open space in the lower portion, a dividing member between upper and lower portions, and means of securing the filter cloth to said dividing member.

4. A pressure filter the body whereof comprises a plurality of alining sections clamped together, the upper portion of the filter body forming a plurality of filter cells, and the lower portion thereof forming a trough below said filter cells; filter cloth held by and forming a joint between the sections, a bar extending across the interior of alternate sections forming a division between the filter cells and the trough below, and means of holding the filter cloth in close contact with said bar.

5. A pressure filter the body whereof comprises a plurality of sections, filter cloth forming a joint between the sections, means of clamping the sections together, the interior of the filter body being divided into a plurality of vertical filter cells in the upper portion thereof and a continuous chamber in the lower portion in communication with the filter cells, means of securing the filter cloth to a division bar at the lower termination of the filter cells.

6. A filter unit having plane parallel surfaces on the outer walls thereof, a bar across the unit flush with the outer walls, means of securing the filter cloth to said bar.

In testimony whereof I have signed my name in the presence of two subscribing witnesses.

ERNEST J. SWEETLAND.

Witnesses:
Wm. Hislop,
L. B. Sandall.